United States Patent
Takemura

(10) Patent No.: US 8,259,946 B2
(45) Date of Patent: Sep. 4, 2012

(54) COMMUNICATION APPARATUS, READER/WRITER, COMMUNICATION SYSTEM, AND COMMUNICATION METHOD

(75) Inventor: Toshiharu Takemura, Tokyo (JP)

(73) Assignee: Sony Corporation, Tokyo (JP)

( * ) Notice: Subject to any disclaimer, the term of this patent is extended or adjusted under 35 U.S.C. 154(b) by 426 days.

(21) Appl. No.: 12/534,994

(22) Filed: Aug. 4, 2009

(65) Prior Publication Data

US 2010/0034387 A1 Feb. 11, 2010

(30) Foreign Application Priority Data

Aug. 5, 2008 (JP) ................................. 2008-202076

(51) Int. Cl.
*G06F 21/00* (2006.01)
*H04L 9/14* (2006.01)
(52) U.S. Cl. ........................................ 380/270; 713/189
(58) Field of Classification Search .................. 713/165, 713/166, 167, 168, 169, 170, 194, 500, 501, 713/502, 503, 600; 726/9, 20; 380/270
See application file for complete search history.

(56) References Cited

U.S. PATENT DOCUMENTS

2006/0180666 A1* 8/2006 Yamashita et al. ............ 235/451

FOREIGN PATENT DOCUMENTS

JP 2007-279966 10/2007

* cited by examiner

*Primary Examiner* — Gilberto Barron, Jr.
*Assistant Examiner* — Izunna Okeke
(74) *Attorney, Agent, or Firm* — K&L Gates LLP

(57) ABSTRACT

There is provided a communication apparatus including a non-contact communication unit for performing a non-contact communication with a reader/writer; a storage unit for storing data for every logic system corresponding to at least one encryption method, and retransmission interval information of each communication command transmitted from the reader/writer for every encryption method; and a selection unit for selecting the retransmission interval information of each communication command in the encryption method to which the logic system specified by the reader/writer corresponds from the storage unit. The retransmission interval information selected by the selection unit is transmitted from the non-contact communication unit to the reader/writer.

5 Claims, 13 Drawing Sheets

FIG. 11

| RESPONSE CODE | MANUFACTURER CODE | UNIQUE ID | IC CODE | P1 | P2 | P3 | P4 | P5 | P6 | OPTION DATA |

COMMUNICATION APPARATUS, READER/WRITER, COMMUNICATION SYSTEM, AND COMMUNICATION METHOD

CROSS REFERENCES TO RELATED APPLICATIONS

The present application claims priority to that disclosed in Japanese Priority Patent Application JP 2008-202076 filed in the Japan Patent Office on Aug. 5, 2008, the entire content of which is hereby incorporated by reference.

BACKGROUND

The present invention relates to a communication apparatus, a reader/writer, a communication system, and a communication method.

In recent years, a non-contact IC (Integrated Circuit) card that can non-contact communicate with a reader/writer is being widespread used. The reader/writer and the non-contact IC card perform communication by using a magnetic field of a specific frequency such as 13.56 MHz as a carrier wave. Specifically, the communication is carried out by having the reader/writer transmit an encrypted carrier wave signal on the carrier wave, and the non-contact IC card receive the carrier wave and return a response signal (response) (see e.g., Japanese Patent Application Laid-Open No. 2007-279966).

If the communication state is unstable for reasons such as the distance between the reader/writer and the non-contact IC card is far, the reader/writer may not properly receive the response with respect to a communication command transmitted to the non-contact IC card within a predetermined retransmission interval. In this case, the reader/writer guarantees the communication quality by retransmitting to the non-contact IC card a communication command of the same content as the content transmitted to the non-contact IC card immediately before. A parameter indicating the retransmission interval is set for every communication command in the non-contact IC card, where only one set is set in one non-contact IC card.

Such non-contact IC card excels in convenience as it can non-contact communicate with the reader/writer by simply being placed over the reader/writer even if it is placed in a wallet, an IC card holder, and the like. The non-contact IC card is thus applied to various services such as electronic money service, transportation service, and personal authentication service, and the widespread use of the non-contact IC card is increasingly advancing. A function corresponding to a plurality of services tends to be mounted in one non-contact IC card to be load in the portable telephone in the near future.

However, the plurality of services mounted in one non-contact IC card sometimes includes the service requiring higher security level and the service requiring shorter processing time. Thus, the non-contact IC card that can correspond to a plurality of encryption methods is desired. It can be assumed that the processing time differs depending on the high and low of the security level of the encryption method, but an issue in that an optimum retransmission interval may not be applied for every encryption method arises since the parameter indicating the retransmission interval that can be set to one non-contact IC card is only one set.

Therefore, it is desirable to provide an improved communication apparatus that can apply the retransmission interval corresponding to the encryption method, a reader/writer, a communication system, and a communication method.

SUMMARY

According to an embodiment, there is provided a communication apparatus including: a non-contact communication unit for performing non-contact communication with a reader/writer; a storage unit for storing data for every logic system corresponding to at least one encryption method, and retransmission interval information of each communication command transmitted from the reader/writer for every encryption method; and a selection unit for selecting the retransmission interval information of each communication command in the encryption method to which the logic system specified by the reader/writer corresponds from the storage unit, wherein the retransmission interval information selected by the selection unit is transmitted from the non-contact communication unit to the reader/writer.

The selection unit may compare the retransmission interval information of each communication command for every plurality of encryption methods, and selects the retransmission interval information indicating longer interval for every communication command when the logic system specified by the reader/writer corresponds to the plurality of encryption methods.

According to another embodiment, there is provided a reader/writer including: a non-contact communication unit for performing non-contact communication with a communication apparatus; a generation unit for generating a packet, containing specification information of a logic system, transmitted from the non-contact communication unit to the communication apparatus; and a communication control unit for performing a retransmission control of the communication command to the communication apparatus based on the retransmission interval information for every communication command which differs according to the encryption method to which the logic system specified by the packet corresponds and which is contained in a response packet transmitted from the communication apparatus according to the packet.

According to another embodiment of the present invention, there is provided a communication system including: a reader/writer; and a communication apparatus including, a first non-contact communication unit for performing non-contact communication with the reader/writer, a storage unit for storing data for every logic system corresponding to at least one encryption method and retransmission interval information of each communication command transmitted from the reader/writer for every encryption method, and a selection unit for selecting the retransmission interval information of each communication command in the encryption method to which the logic system specified by the reader/writer corresponds from the storage unit, the retransmission interval information selected by the selection unit being transmitted from the first non-contact communication unit to the reader/writer More specifically, the reader writer includes, a second non-contact communication unit for performing non-contact communication with the communication apparatus, a generation unit for generating a packet, containing specification information of the logic system, transmitted from the second non-contact communication unit to the communication apparatus, and a communication control unit for performing a retransmission control of the communication command to the communication apparatus based on the retransmission interval information for every communication command transmitted from the communication apparatus according to the packet.

According to another embodiment, there is provided a communication method including the steps of: specifying an arbitrary logic system through non-contact communication from a reader/writer; selecting retransmission interval information of each communication command in an encryption method to which the logic system specified by the reader/writer corresponds from a storage medium for storing data for every logic system corresponding to at least one encryption method and the retransmission interval information of each communication command transmitted from the reader/writer for every encryption method; and transmitting the selected retransmission interval information to the reader/writer through non-contact communication.

According to the embodiments described above, the retransmission interval corresponding to the encryption method can be applied.

Additional features and advantages are described herein, and will be apparent from the following Detailed Description and the figures.

BRIEF DESCRIPTION OF THE FIGURES

FIG. 11 is an explanatory view showing a configuration example of a response packet;

DETAILED DESCRIPTION

Figure 1:
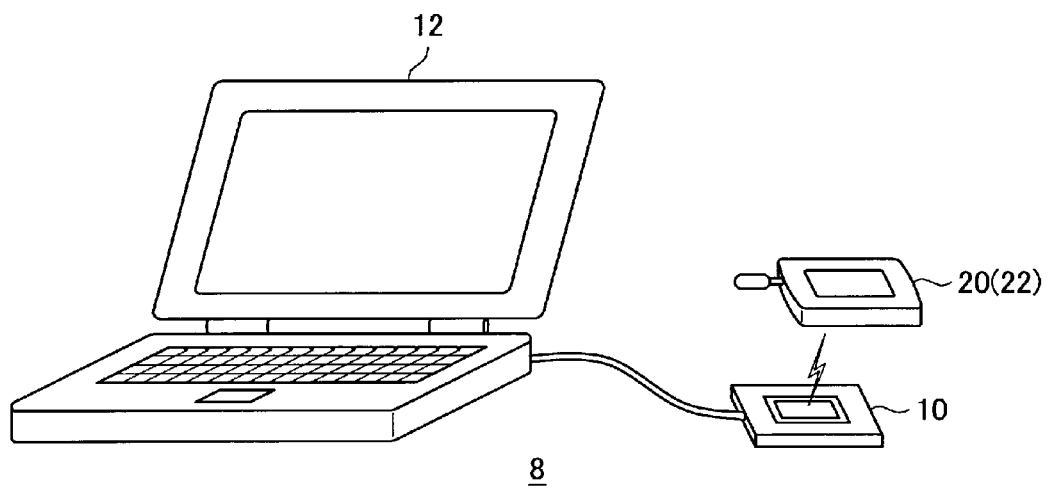
FIG. 1 is an explanatory view showing an overall configuration of a communication system according to the present embodiment.

Hereinafter, embodiments will be described in detail with reference to the appended drawings. Note that, in this specification and the appended drawings, structural elements that have substantially the same function and structure are denoted with the same reference numerals, and repeated explanation of these structural elements is omitted.

The embodiments will be described in the following order.

[1] Overall configuration of communication system according to present embodiment

[2] Background of present embodiment

[3] Configuration of portable telephone and non-contact IC card according to present embodiment

[4] Operation according to present embodiment

[5] Conclusion

[1] OVERALL CONFIGURATION OF COMMUNICATION SYSTEM ACCORDING TO PRESENT EMBODIMENT

First, an overall configuration of a communication system 8 according to the present embodiment will be described with reference to FIG. 1.

FIG. 1 is an explanatory view showing an overall configuration of the communication system 8 according to the present embodiment. As shown in FIG. 1, the communication system 8 includes a reader/writer 10, a PC (Personal Computer) 12, and a portable telephone 20.

The reader/writer 10 (data reading and writing device) performs a non-contact communication with a non-contact IC card 22 arranged in the portable telephone 20. For instance, when the non-contact IC card 22 of the portable telephone 20 is brought close, the reader/writer 10 can write data to the non-contact IC card 22 or read out data from the non-contact IC card 22 based on an instruction from the PC 12.

The non-contact IC card 22 (communication apparatus) arranged in the portable telephone 20 includes an antenna (250) for non-contact communicating with the reader/writer 10 at a thin card outer package, and an IC chip loaded with an IC for executing a predetermined calculation process. The IC chip may have a tamper resistance property, so that write, update and the like of the data where alteration of data becomes an issue such as electronic money can be safely carried out. The non-contact IC card 22 according to the present embodiment is not limited to a configuration in which the antenna and the IC chip are equipped as separate bodies, and may have the antenna built in the IC chip or may have the antenna and the IC chip as an integrated package.

The antenna arranged in the non-contact IC card 22 can configure a resonance circuit by including a coil having a predetermined inductance and a capacitor having a predetermined electrostatic capacity. The non-contact IC card 22 demodulates an alternating current (AC) component of an induced voltage generated by electromagnetic induction when a magnetic field of a predetermined frequency (hereinafter referred to as "carrier wave") transmitted from the reader/writer 10 passes the antenna. According to such configuration, the non-contact IC card 22 can retrieve the data transmitted from the reader/writer 10 and can be driven by obtaining power from a direct current (DC) component of the induced voltage.

The non-contact IC card 22 can respond by performing load modulation and generating a diamagnetic field with respect to the carrier wave from the antenna. The reader/writer 10 can detect the change in impedance of the non-contact IC card 22 seen from the reader/writer 10 that occurs by load modulation as a response signal from the non-contact IC card 22.

As described above, the reader/writer 10 and the non-contact IC card can non-contact communicate by using the carrier wave. Therefore, the communication between the reader/writer 10 and the non-contact IC card 22 is carried out (e.g., reading and writing of data are carried out) by simply having the user place the non-contact IC card 22 over the reader/writer 10. The non-contact IC card 22 is easy to use as it does not need to be inserted or removed with respect to the reader/writer 10, can rapidly transmit and receive data, has high safety as it is hard to be altered or falsified, and is convenient as the card itself can be reused over a number of times by rewriting the data.

Therefore, the provision of services using the non-contact IC card 22 is being socially spreading, and the IC card system providing various types of services is operating. The IC card system using the non-contact IC card 22 includes an electronic money system, a traffic ticket barrier system, toll system at highway, electronic settlement system, security system for admission to a building or a room, login of PC etc., and the like. In other words, the non-contact IC card 22 functions as various types of cards described in (1) to (6).

(1) Electronic money card stored with electronic value (currency or data having a value complying with currency) such as electronic money, point, and coupon;
(2) Transportation card stored with data of commutation pass or reserved ticket, and prepaid transport cost of transportation such as trains, buses, and highway;
(3) Personal authentication card used as an ID such as employee ID card and student ID card used for ID check, management of beginning and ending of work, and key when entering or exiting a building;
(4) Members card, point card, and coupon card of various types of stores and facilities;
(5) Electronic ticket card stored with electronic ticket data of movie theater, concert hall, sports athletic field, and amusement facility;
(6) Electronic settlement card used in shopping on the Internet, distribution of moving image/music content, and electronic business transactions such as buying and selling of financial products including stocks and bonds, and deposits.

FIG. 1 merely shows the portable telephone 20 as an example of a device on which the non-contact IC card 22 is loaded, and the present invention is not limited to such example. For instance, the non-contact IC card 22 may be loaded in an arbitrary information processing device such as a PC, a household video processing device (DVD recorder, video cassette recorder, etc.), portable telephone, PHS (Personal Handyphone System), portable music reproduction device, portable video processing device, PDA (Personal Digital Assistants), household game machine, portable game machine, and home electronic appliances. Furthermore, the non-contact IC card 22 may be independently used without being loaded in the information processing device.

The non-contact IC card 22 for performing communication by the magnetic field has been described above as one example of a communication apparatus, but the present invention is not limited to such example. For instance, the communication apparatus may have a function of performing a one-to-one near field communication by electric field coupling.

The flow of communication performed between the reader/writer 10 and the non-contact IC card 22 will be described below with reference to FIGS. 2 and 3.

Figure 2:
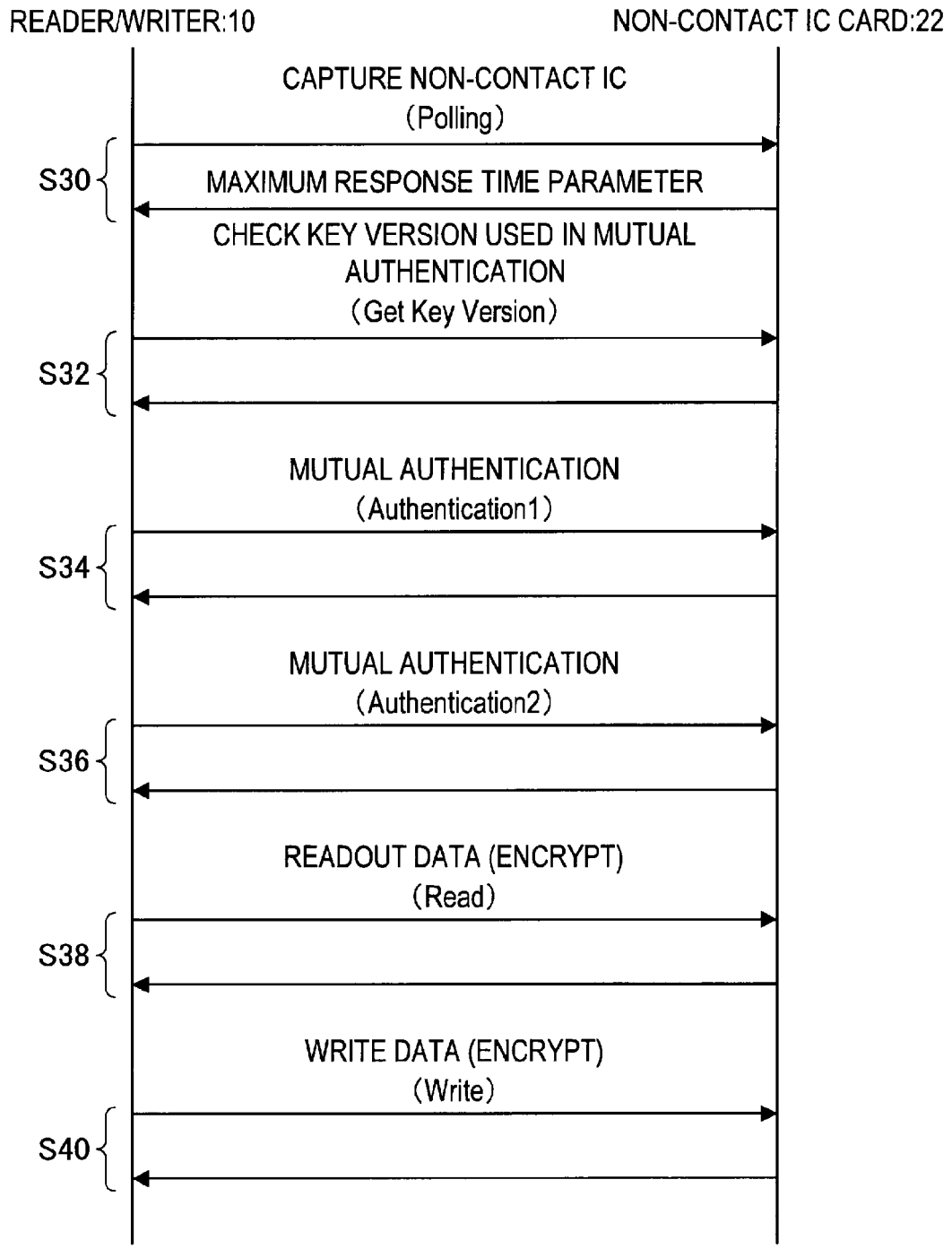
FIG. 2 is a sequence chart showing the flow of communication performed between the reader/writer and the non-contact IC card.

FIG. 2 is a sequence chart showing the flow of communication performed between the reader/writer 10 and the non-contact IC card 22. As shown in FIG. 2, the reader/writer 10 first executes a command of capturing the non-contact IC card 22 (Polling). The non-contact IC card 22 supplied with power by the carrier wave from the reader/writer 10 receives the Polling, and returns a response packet when conforming with the response conditions (S30).

Subsequently, the reader/writer 10 executes a command of acquiring version information of a key for performing the subsequent encrypted communication (Get Key Version) with respect to the non-contact IC card 22. The non-contact IC card 22 returns a response including the key version information according to the specified parameter (S32).

The reader/writer 10 and the non-contact IC card 22 then perform mutual authentication (S34, S36). If the mutual authentication is normally carried out, the subsequent encrypted communication becomes possible. For instance, the reader/writer 10 reads out the data stored in the non-contact IC card 22 (S38), and writes the data to the non-contact IC card 22 (S40). The data transmitted and received between the reader/writer 10 and the non-contact IC card 22 is encrypted.

If the communication state is unstable due to reasons such as the distance between the reader/writer 10 and the non-contact IC card 22 is far, the reader/writer 10 may not normally receive the response with respect to the communication command transmitted to the non-contact IC card 22 within a predetermined retransmission interval. In this case, the reader/writer 10 guarantees the communication quality by retransmitting to the non-contact IC card 22 the communication command of the same content as the content transmitted immediately before to the non-contact IC card 22. The retransmission control by the reader/writer 10 will be specifically described below with reference to FIG. 3.

Figure 3:
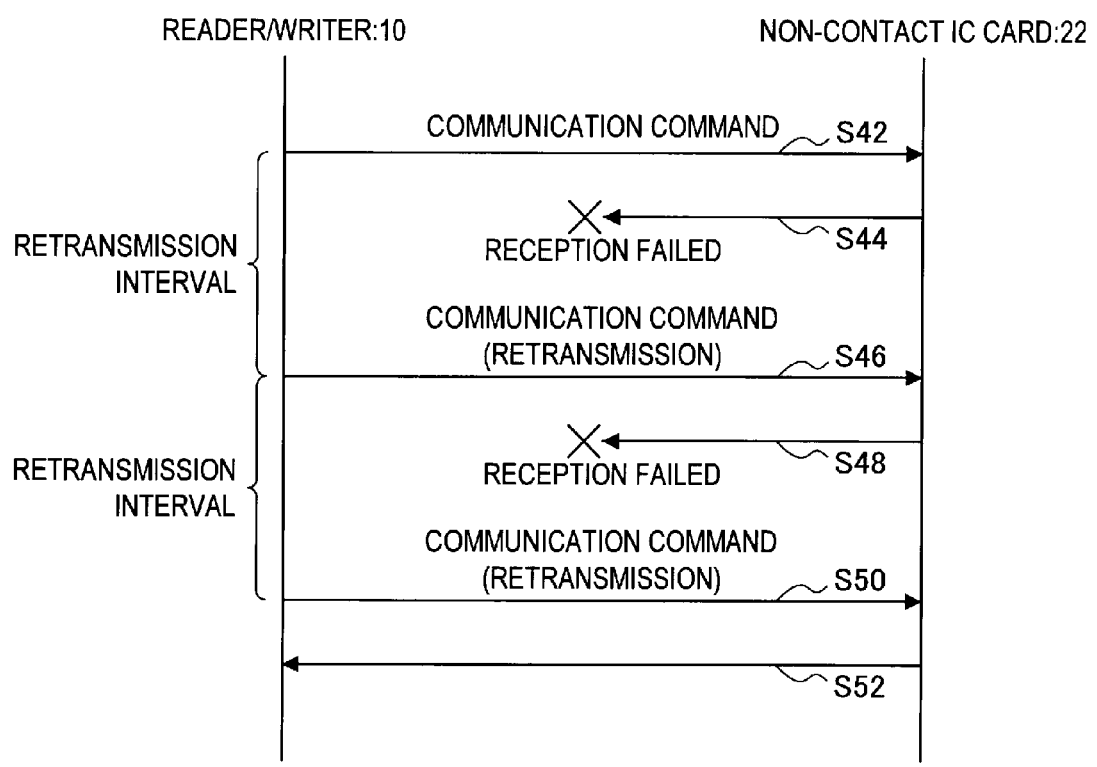
FIG. 3 is a sequence chart showing the flow of retransmission control by the reader/writer.

FIG. 3 is a sequence chart showing the flow of retransmission control by the reader/writer 10. As shown in FIG. 3, the reader/writer 10 first transmits a certain communication command to the non-contact IC card 22 (S42). When receiving the communication command, the non-contact IC card 22 then transmits a response packet with respect to the communication command (S44). However, if the retransmission interval elapses from the previous transmission of the communication command without the reader/writer normally receiving the response packet as shown in FIG. 3, the reader/writer 10 retransmits the communication command to the non-contact IC card 22 (S46).

When receiving the communication command, the non-contact IC card 22 transmits the response packet with respect to the communication command (S48). However, if the retransmission interval elapses from the previous transmission of the communication command again without the reader/writer normally receiving the response packet, the reader/writer 10 retransmits the communication command to the non-contact IC card 22 (S50). When receiving the communication command, the non-contact IC card 22 transmits the response packet with respect to the communication command (S52). The communication quality between the reader/writer 10 and the non-contact IC card 22 is guaranteed by such retransmission control.

[2] BACKGROUND OF PRESENT EMBODIMENT

After describing the retransmission interval using the non-contact IC card related to the present embodiment by way of example, the background of the present embodiment will be described.

Figure 4:
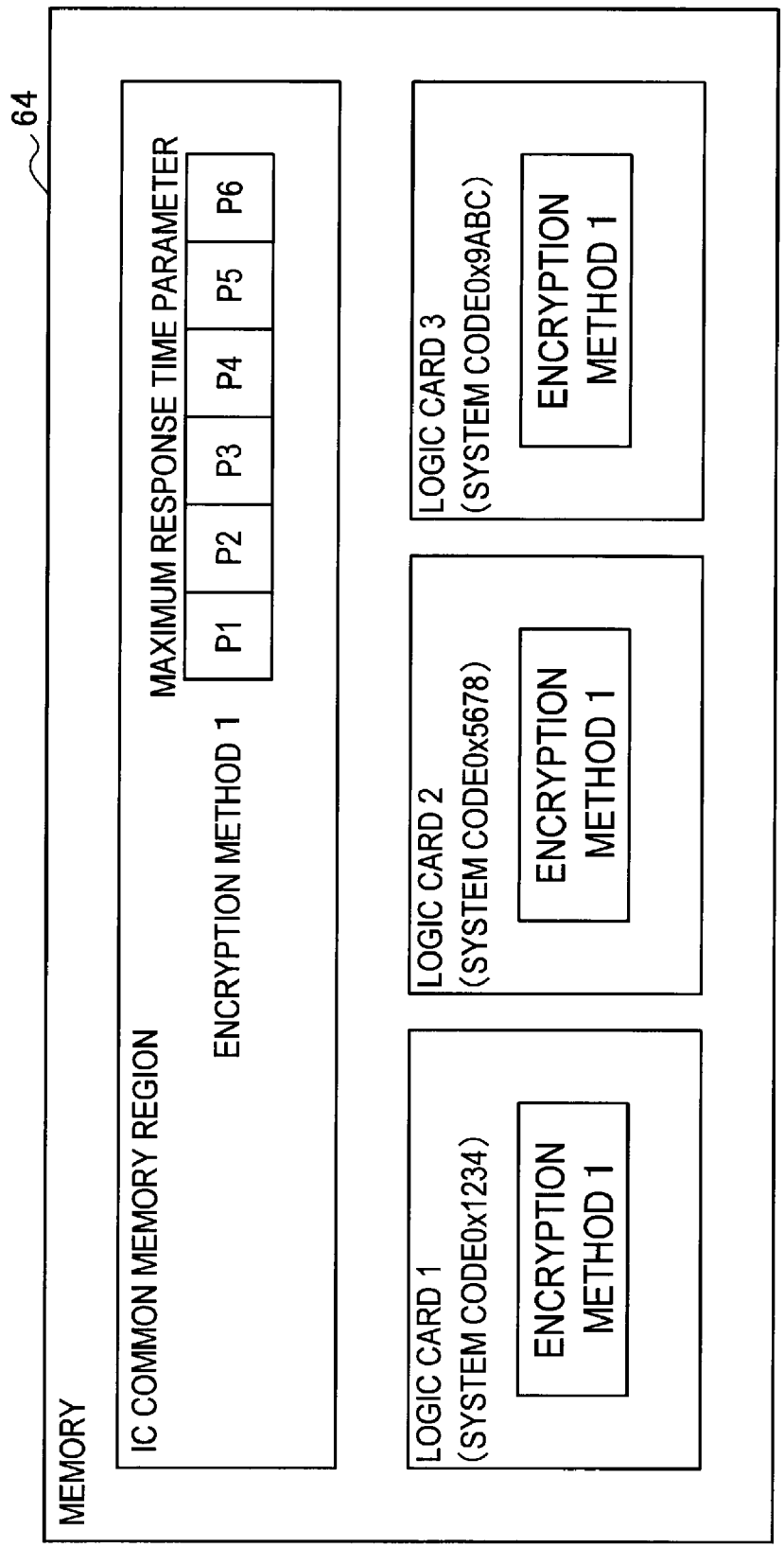
FIG. 4 is an explanatory view showing a configuration of a memory of the non-contact IC card related to the present embodiment.

FIG. 4 is an explanatory view showing a configuration of a memory 64 of the non-contact IC card related to the present embodiment. As shown in FIG. 4, the memory 64 of the non-contact IC card related to the present embodiment is logically sectionalized into a plurality of regions. Specifically, the memory 64 includes an IC common memory region, a logic card 1, a logic card 2, and a logic card 3.

Each logic card functions as at least one of the cards described in (1) to (6) above by way of example. For instance, the logic card 1 functions as a transportation card, where the data corresponding to the commutation pass is stored in the logic card 1 as user data.

A system code is set to each logic card. For instance, the system code "0x1234" is set to the logic card 1, the system code "0x5678" is set to the logic card 2, and the system code "0x9ABC" is set to the logic card 3. Furthermore, as shown in FIG. 4, the logic card 1, the logic card 2, and the logic card 3 correspond to only a single encryption method 1.

The maximum response time parameters P1 to P6 of the encryption method 1 are stored in the IC common memory region. Each maximum response time parameter P1 to P6 is a parameter for specifying the retransmission interval of every communication command. For instance, the maximum response time parameter P1 is a parameter for specifying the retransmission interval of the Get Key Version (S32) shown in FIG. 2, and the maximum response time parameter P5 is a parameter for specifying the retransmission interval of the Write (S40).

The non-contact IC card related to the present embodiment transmits the maximum response time parameters P1 to P6 of the encryption method 1 by including the same in the response packet that responds to the Polling from the reader/writer 10. As a result, the reader/writer 10 can specify the retransmission interval of each communication command. A specific example until the non-contact IC card related to the present embodiment transmits the response packet containing the maximum response time parameters P1 to P6 will be described below with reference to FIG. 5.

Figure 5:
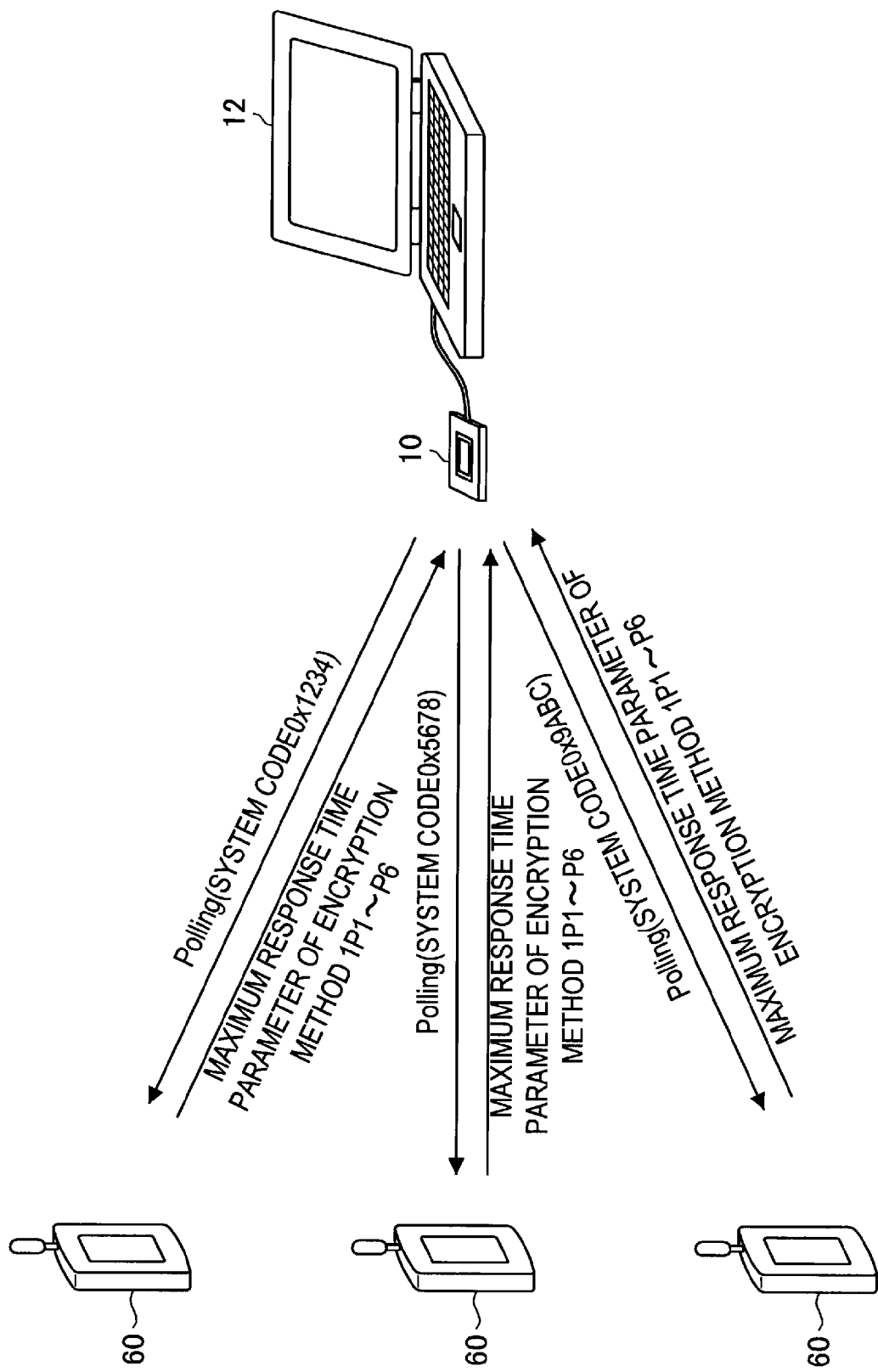
FIG. 5 is an explanatory view showing a specific example of the operation of the non-contact IC card related to the present embodiment.

FIG. 5 is an explanatory view showing a specific example of the operation of the non-contact IC card related to the present embodiment. As shown in FIG. 5, when the reader/writer 10 transmits the Polling packet containing the system code "0x1234", the non-contact IC card 60 related to the present embodiment specifies the encryption method 1 corresponding to the logic card 1 set with the system code "0x1234". The non-contact IC card related to the present embodiment extracts the maximum response time parameters P1 to P6 of the specified encryption method 1 from the IC common memory region, and transmits the response packet containing the maximum response time parameters P1 to P6 of the encryption method 1.

When the reader/writer 10 transmits the Polling packet containing the system code "0x5678", the non-contact IC card 60 related to the present embodiment specifies the encryption method 1 corresponding to the logic card 2 set with the system code "0x5678". The non-contact IC card related to the present embodiment extracts the maximum response time parameters P1 to P6 of the specified encryption method 1 from the IC common memory region, and transmits the response packet containing the maximum response time parameters P1 to P6 of the encryption method 1.

Similarly, when the reader/writer 10 transmits the Polling packet containing the system code "0x9ABC", the non-contact IC card 60 related to the present embodiment specifies the encryption method 1 corresponding to the logic card 3 set with the system code "0x9ABC". The non-contact IC card related to the present embodiment extracts the maximum response time parameters P1 to P6 of the specified encryption method 1 from the IC common memory region, and transmits the response packet containing the maximum response time parameters P1 to P6 of the encryption method 1.

Thus, only a set of maximum response time parameters P1 to P6 is stored in the non-contact IC card 60 related to the present embodiment. Thus, the non-contact IC card 60 related to the present embodiment transmits the response packet containing the same maximum response time parameters P1 to P6 regardless of which system code is specified by the reader/writer 10.

One non-contact IC card is sometimes mounted with a function for providing a plurality of services such as the service requiring higher security level and the service requiring shorter processing time. Thus, the non-contact IC card that can correspond to a plurality of encryption methods is desired. Although it can be assumed that the processing time differs depending on the high and low of the security level of the encryption method, an optimum retransmission interval may not be applied for every encryption method since only one set of maximum response time parameters P1 to P6 can be set to one non-contact IC card.

The portable telephone 20 and the non-contact IC card 22 according to the present embodiment have been contrived in view of such situation. According to the portable telephone 20 and the non-contact IC card 22 of the present embodiment, the retransmission interval corresponding to the encryption method can be applied. The portable telephone 20 and the non-contact IC card 22 according to the present embodiment will be described in detail below with reference to FIGS. 6 to 13.

[3] CONFIGURATION OF PORTABLE TELEPHONE AND NON-CONTACT IC CARD ACCORDING TO PRESENT EMBODIMENT

First, the hardware configuration of the portable telephone 20 according to the present embodiment will be described with reference to FIG. 6.

Figure 6:
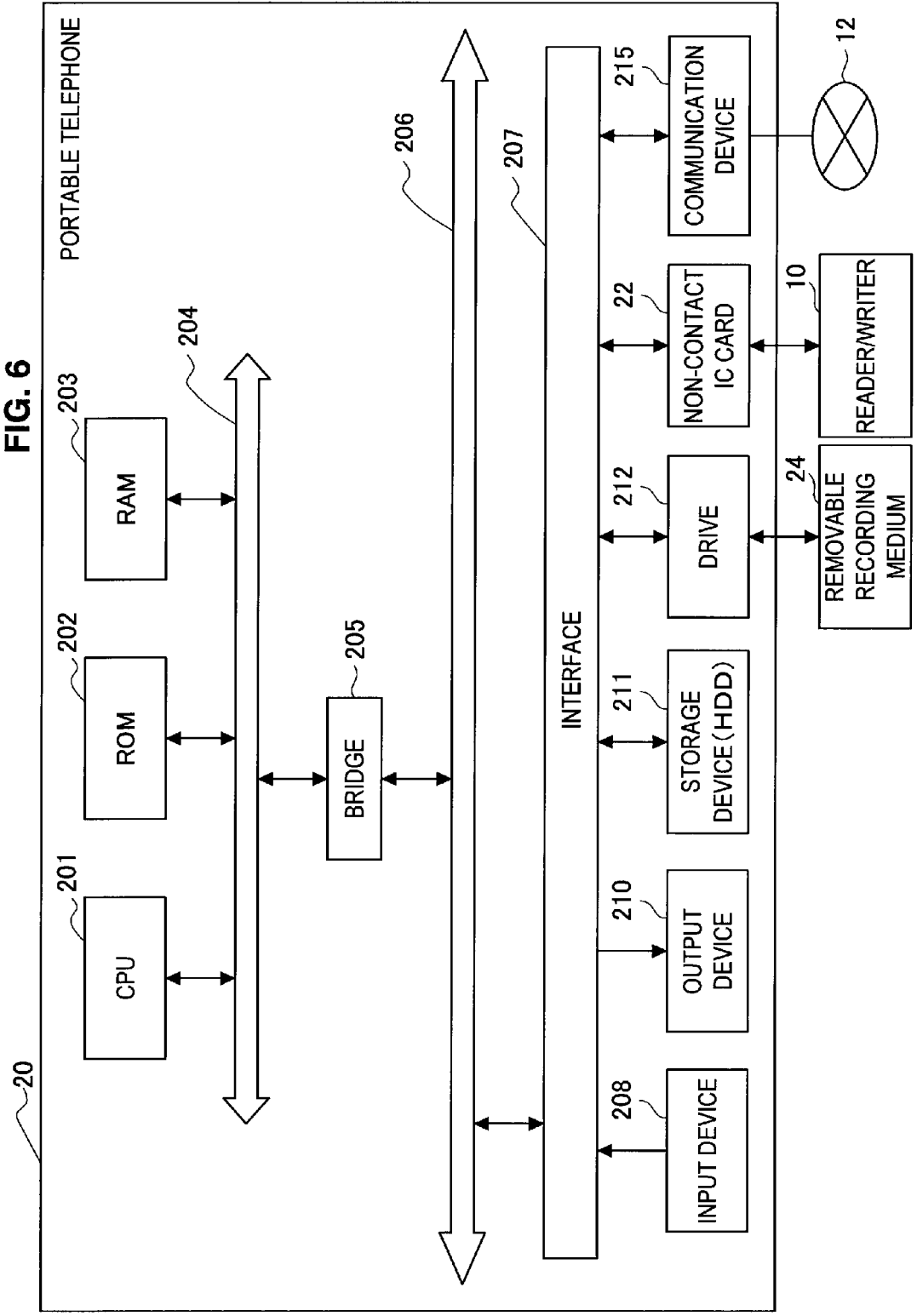
FIG. 6 is a block diagram showing the hardware configuration of the portable telephone.

FIG. 6 is a block diagram showing the hardware configuration of the portable telephone 20. The portable telephone 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212, a communication device 215, and the non-contact IC card 22.

The CPU 201 functions as a calculation processing device and a control device, and controls the overall operation of the portable telephone 20 according to various types of programs. The CPU 201 may be a microprocessor. The ROM 202 stores programs, calculation parameters and the like used by the CPU 201. The RAM 203 temporarily stores the program used in the execution of the CPU 201, the parameter that appropriately changes in such execution, and the like. These components are mutually connected by the host bus 204 configured by a CPU bus and the like.

The host bus 204 is connected to the external bus 206 such as PCI (Peripheral Component Interconnect/Interface) bus by way of the bridge 205. The host bus 204, the bridge 205, and the external bus 205 may not be separately configured, and the functions thereof may be mounted in one bus.

The input device 208 is configured by an input means for the user to input information such as mouse, keyboard, touch panel, button, microphone, switch, and lever, and an input control circuit for generating an input signal based on the input by the user and outputting the signal to the CPU 201. The user of the portable telephone 20 can input various types of data or instruct the processing operation to the portable telephone 20 by operating the input device 208.

The output device 210 is configured by a display device such as CRT (Cathode Ray Tube) display device, a liquid crystal display (LCD) device, an OLED (Organic Light Emitting Display) device, and a lamp, and an audio output device such as a speaker and a headphone. The output device 210, for example, outputs the reproduced content. Specifically, the display device displays various types of information such as the reproduced video data in text or image. The audio output device converts the reproduced audio data and the like to audio, and outputs the same.

The storage device 211 is a device for storing data configured as an example of a storage unit of the portable telephone 20 according to the present embodiment. The storage device 211 may include a storage medium, a recording device for recording data on the storage medium, a readout device for reading out data from the storage medium, a deletion device for deleting data recorded on the storage medium, and the like. The storage device 211 is configured by HDD (Hard Disk Drive) and the like. The storage device 211 drives the hard disc and stores programs to be executed by the CPU 201 and various types of data.

The drive 212 is a storage medium reader/writer and is built in or externally attached to the portable telephone 20. The drive 212 reads out information recorded on a loaded removable recording medium 24 such as magnetic disc, optical disc, magnetic optical disc, or semiconductor memory, and outputs the information to the RAM 203.

The communication device 215 is a communication interface configured by a communication device and the like for connecting to a communication network 12. The communication device 215 may be a wireless LAN (Local Area Network) responding communication apparatus, a wireless USB responding communication apparatus, or a wire communication device for performing wire communication.

The non-contact IC card 22 includes a memory (220) recorded with the user data, and an antenna (250) for performing non-contact communication with the reader/writer 10. The configuration of the non-contact IC card 22 and the reader/writer 10 will be specifically described below with reference to FIGS. 7 to 11.

Figure 7:
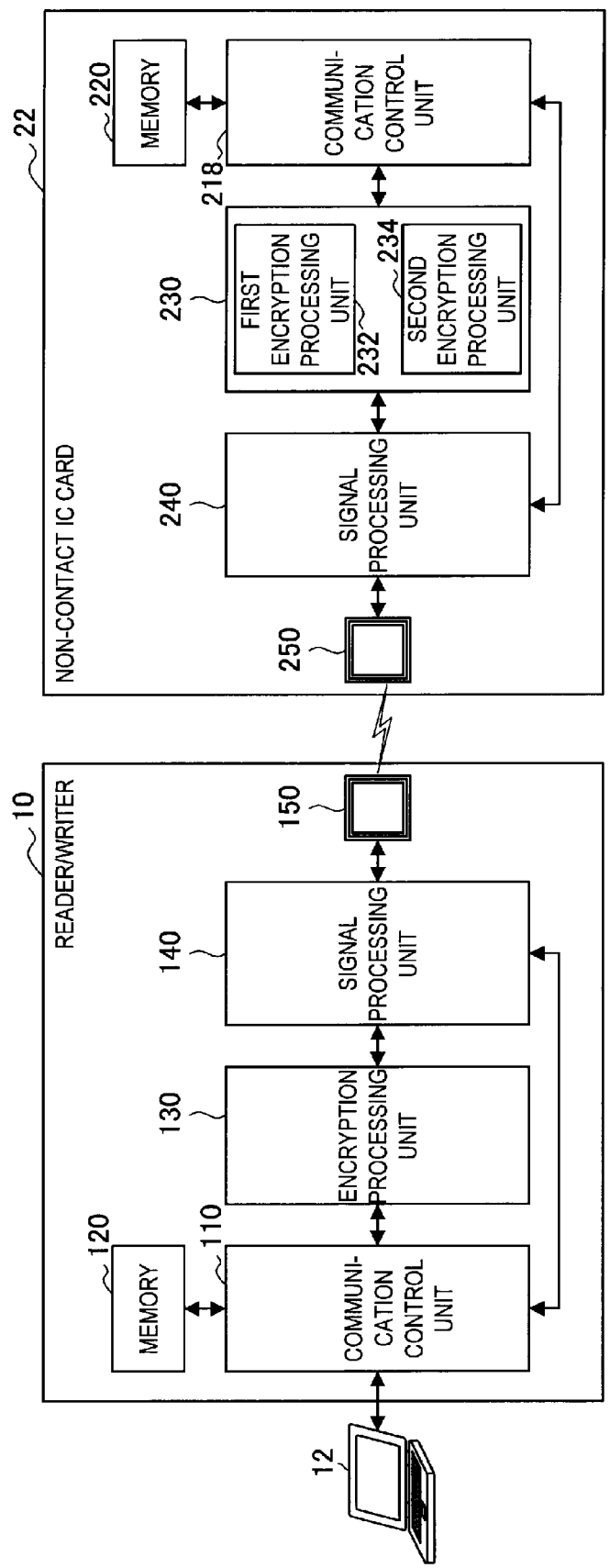
FIG. 7 is a function block diagram showing the configurations of the non-contact IC card and the reader/writer.

FIG. 7 is a function block diagram showing the configurations of the non-contact IC card 22 and the reader/writer 10. As shown in FIG. 7, the reader/writer 10 includes a communication control unit 110, a memory 120, an encryption processing unit 130, a signal processing unit 140, and an antenna 150. The non-contact IC card 22 includes a communication control unit 218, a memory 220, an encryption processing unit 230, a signal processing unit 240, and an antenna 250.

The communication control unit 110 of the reader/writer 10 includes an IC chip equipped with various types of processors, ROM, RAM, and the like, and controls the overall operation of the reader/writer 10. Specifically, the communication control unit 110 of the reader/writer 10 generates a communication command based on the input from the PC 12 (generation unit), analyzes a packet decrypted by the encryption processing unit 130, and performs mutual authentication with the non-contact IC card 22.

The encryption processing unit 130 encrypts the communication command (e.g., Write: write command) input from the communication control unit 110, or decrypts the packet demodulated by the signal processing unit 140. The encryption processing unit 130 may correspond to a plurality of types of encryption methods such as DES (Data Encryption Standard) and AES (Advanced Encryption Standard).

The signal processing unit 140 modulates the communication command input from the communication control unit 110 or the encryption processing unit 130, or demodulates the packet received by the antenna 150. For instance, the signal processing unit 140 may correspond to ASK (Amplitude Shift Keying). The antenna 150 has a function serving as a non-contact communication unit for transmitting the communication command modulated by the signal processing unit 140 by non-contact communication and receiving the packet transmitted from the non-contact IC card 22.

The communication control unit 218 of the non-contact IC card 22 includes an IC chip equipped with various types of processors, ROM, RAM, and the like, and controls the overall operation of the non-contact IC card 22. Specifically, the communication control unit 218 of the non-contact IC card 22 analyzes a communication command from the reader/writer 10, generates a response packet that responds to the communication command, and performs mutual authentication with the reader/writer 10.

The encryption processing unit 230 includes a first encryption processing unit 232 and a second encryption processing unit 234. The second encryption processing unit 234 corresponds to the encryption method 2 having higher security level (confidentiality) than the encryption method 1 to which the first encryption processing unit 232 corresponds. For example, the encryption method 1 may be the DES and the encryption method 2 may be the AES. Such first encryption processing unit 232 or the second encryption processing unit 234 decrypts the communication command demodulated by the signal processing unit 240 or encrypts the data packet generated by the communication control unit 218.

The signal processing unit 240 modulates various types of packets input from the communication control unit 218 or the encryption processing unit 230, or demodulates the communication command received by the antenna 250. For instance, the signal processing unit 240 may correspond to ASK. The antenna 250 has a function serving as a non-contact communication unit for transmitting various types of packets modulated by the signal processing unit 240 by non-contact communication and receiving the communication command transmitted from the reader/writer 10.

The memory 220 functions as a storage unit storing user data for every logic system corresponding to at least one encryption method, and the maximum response time parameter (retransmission interval information) for specifying the retransmission interval of each communication command transmitted from the reader/writer 10. The configuration of the memory 220 will be described with reference to FIGS. 8 and 9.

Figure 8:
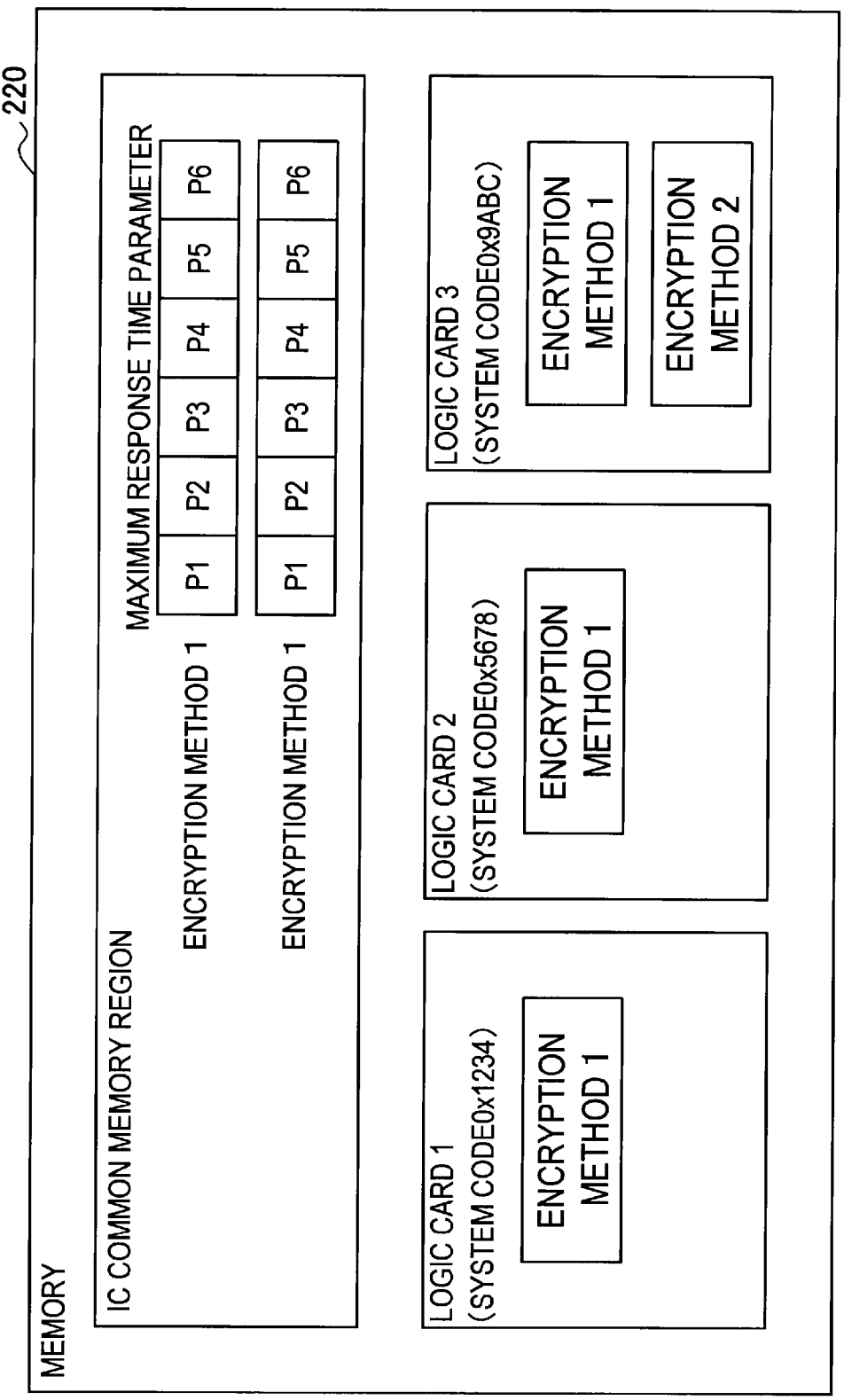
FIG. 8 is an explanatory view showing the configuration of a memory.
Figure 9:
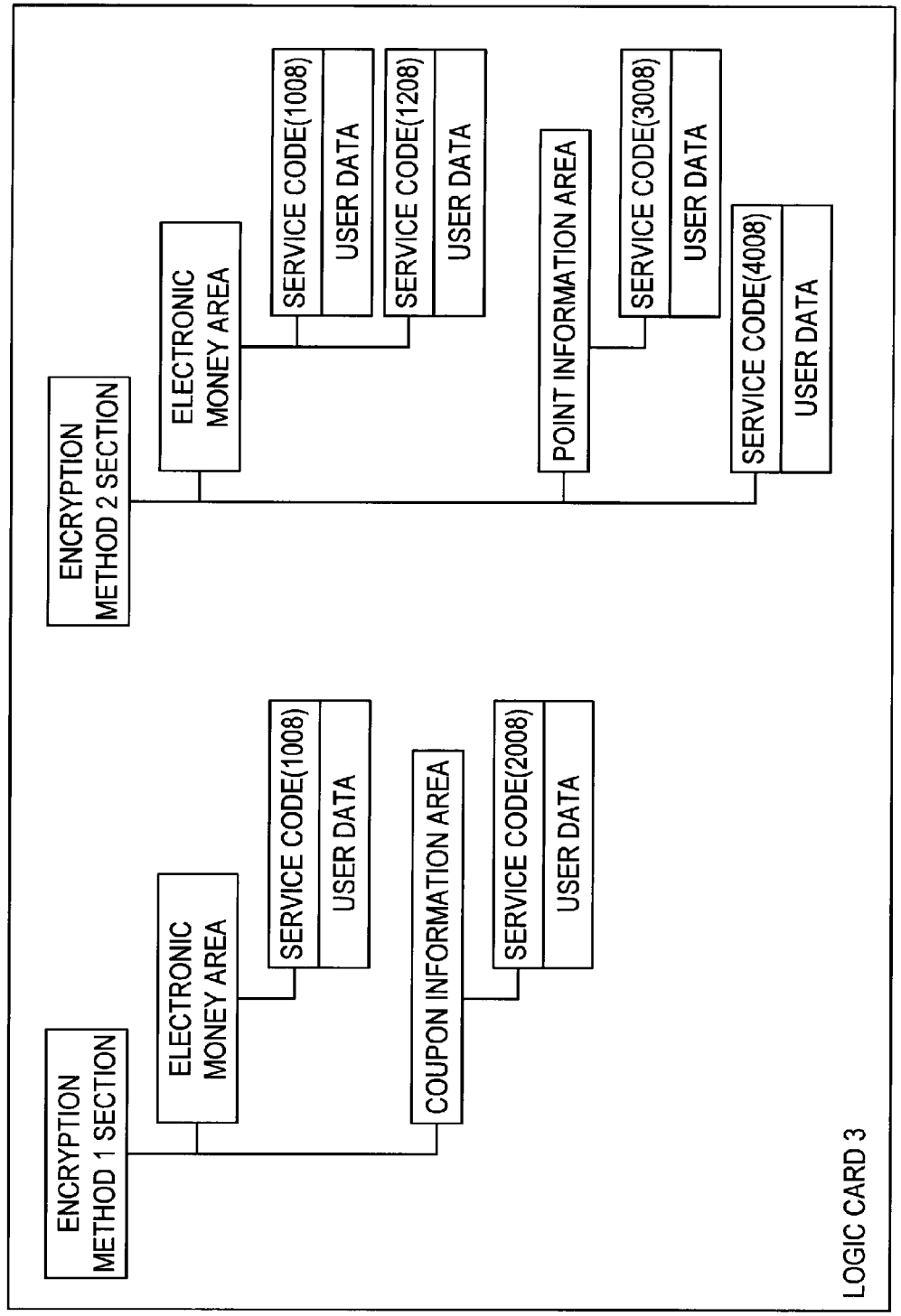
FIG. 9 is an explanatory view showing the configuration of a memory.

FIGS. 8 and 9 are explanatory views showing the configuration of the memory 220. As shown in FIG. 8, the memory 220 is logically sectionalized to a plurality of regions. Specifically, the memory 220 includes the IC common memory region, and the logic card 1, the logic card 2, and the logic card 3 serving as the logic system.

Each logic card functions as at least one of the cards described in (1) to (6) of "[1] Overall configuration of communication system according to present embodiment". For instance, the logic card 1 functions as a transportation card, where the data corresponding to the commutation pass is stored in the logic card 1 as user data.

A system code is set to each logic card. For instance, the system code "0x1234" is set to the logic card 1, the system code "0x5678" is set o the logic card 2, and the system code "0x9ABC" is set to the logic card 3. Furthermore, as shown in FIG. 8, the logic card 1 corresponds to the encryption method 1, the logic card 2 corresponds to the encryption method 2, and the logic card 3 corresponds to both the encryption method 1 and the encryption method 2.

As shown in FIG. 9, the logic card 3 corresponding to both the encryption method 1 and the encryption method 2 include an encryption method 1 section and an encryption method 2 section. Each section is sectionalized into a plurality of areas, where the user data is arranged in correspondence to the service code at the lower level of each area. The reader/writer 10 can perform readout of specific service data or write to the specific service data by specifying the service code. The logic card 1 corresponding to only the encryption method 1 includes only the encryption method 1 section, and the logic card 2 corresponding to only the encryption method 2 includes only the encryption method 2 section.

Furthermore, as shown in FIG. 8, the maximum response time parameters P1 to P6 of the encryption method 1 and the maximum response time parameters P1 to P6 of the encryption method 2 are stored in the IC common memory region. Each maximum response time parameter P1 to P6 is a parameter for specifying the retransmission interval of every communication command. Specifically, the maximum response time parameters P1 to P6 may be a parameter for specifying the retransmission interval of the communication command described below.

P1 and P2: Arbitrary communication commands having different retransmission intervals
P3: Mutual authentication command (Authentication 1, 2)
P4: Readout command (Read)
P5: Write command (Write)
P6: Undefined A configuration example of the Polling packet transmitted from the reader/writer 10 in time of Polling and the response packet transmitted from the non-contact IC card 22 in response to the Polling packet will now be described with reference to FIGS. 10 and 11.

Figure 10:
FIG. 10 is an explanatory view showing a configuration example of a Polling packet.

FIG. 10 is an explanatory view showing a configuration example of the Polling packet. As shown in FIG. 10, the Polling packet includes a command code, a system code, an option, and a time slot value. The command code is a code indicating that the relevant command is Polling. The system code is specifying information specifying one of the logic cards of the non-contact IC card 22. The option is added, as necessary, and the time slot value is information related to the transmission timing of the response packet from the non-contact IC card 22.

The communication control unit 218 of the non-contact IC card 22 has a function serving as a selection unit for analyzing the Polling packet, and selecting the maximum response time parameters P1 to P6 of the encryption method to which the logic card specified by the system code corresponds. Specifically, the communication control unit 218 selects the maximum response time parameters P1 to P6 of the encryption method 1 when the logic card 1 corresponding to only the encryption method 1 is specified. The communication control unit 218 selects the maximum response time parameters P1 to P6 of the encryption method 2 when the logic card 2 corresponding to only the encryption method 2 is specified.

The communication control unit 218 compares each maximum response time parameter P1 to P6 of the encryption method 1 and each maximum response time parameter P1 to P6 of the encryption method 2 when the logic card 3 corresponding to both the encryption method 1 and the encryption method 2 is specified. The communication control unit 218 then selects a parameter of longer retransmission interval for every maximum response time parameter P1 to P6.

For instance, the communication control unit 218 compares the maximum response time parameter P1 of the encryption method 1 and the maximum response time parameter P1 of the encryption method 2, and selects the parameter having longer specified retransmission interval. The communication control unit 218 also similarly performs the selection of the maximum response time parameters P2 to P6.

The communication control unit 218 generates a response packet containing the selected maximum response time parameters P1 to P6, and the antenna 250 transmits the relevant response packet. As shown in FIG. 11, the response packet contains response code, manufacturer code (manufacturer information), unique ID (manufacturing information), IC code (chip type identification information), maximum response time parameters P1 to P6, and option data.

The reader/writer 10 receiving the relevant response packet specifies the retransmission interval based on the maximum response time parameters P1 to P6, and performs retransmission control of the communication command based on the specified retransmission interval.

[4] OPERATION ACCORDING TO PRESENT EMBODIMENT

The configurations of the portable telephone 20 and the non-contact IC card 22 according to the present embodiment have been described above. The operations of the portable telephone 20 and the non-contact IC card 22 according to the present embodiment will now be described with reference to FIGS. 12 and 13.

Figure 12:
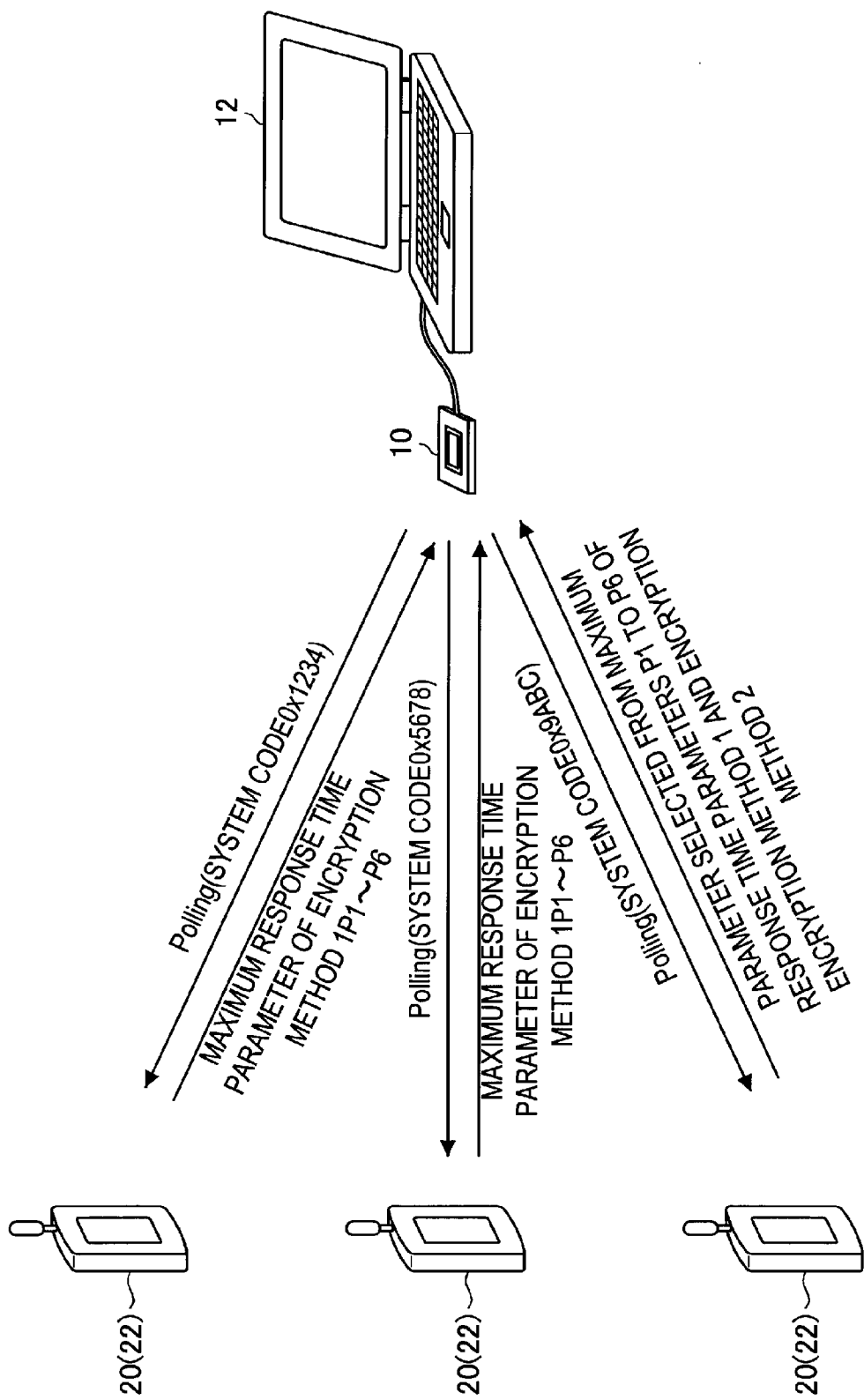
FIG. 12 is an explanatory view schematically showing the operation of the non-contact IC card according to the present embodiment.

FIG. 12 is an explanatory view schematically showing the operation of the non-contact IC card 22 according to the present embodiment. As shown in FIG. 12, when the reader/writer 10 transmits the Polling packet containing the system code "0x1234", the non-contact IC card 22 according to the present embodiment specifies the encryption method 1 corresponding to the logic card 1 set with the system code "0x1234". The non-contact IC card 22 according to the present embodiment selects the maximum response time parameters P1 to P6 of the specified encryption method 1 from the IC common memory region, and transmits the response packet containing the maximum response time parameters P1 to P6 of the encryption method 1.

When the reader/writer 10 transmits the Polling packet containing the system code "0x5678", the non-contact IC card 22 according to the present embodiment specifies the encryption method 2 corresponding to the logic card 2 set with the system code "0x5678". The non-contact IC card 22 according to the present embodiment selects the maximum response time parameters P1 to P6 of the specified encryption method 2 from the IC common memory region, and transmits the response packet containing the maximum response time parameters P1 to P6 of the encryption method 2.

When the reader/writer 10 transmits the Polling packet containing the system code "0x9ABC", the non-contact IC card 22 according to the present embodiment specifies the encryption methods 1 and 2 corresponding to the logic card 3 set with the system code "0x9ABC". The non-contact IC card 22 compares each maximum response time parameter P1 to P6 of the encryption method 1 and each maximum response time parameter P1 to P6 of the encryption method 2, and selects the maximum response time parameter with the longest specified retransmission interval for every maximum response time parameter P1 to P6. The non-contact IC card 22 then generates the response packet containing the selected maximum response time parameters P1 to P6 and transmits the response packet to the reader/writer 10.

Figure 13:
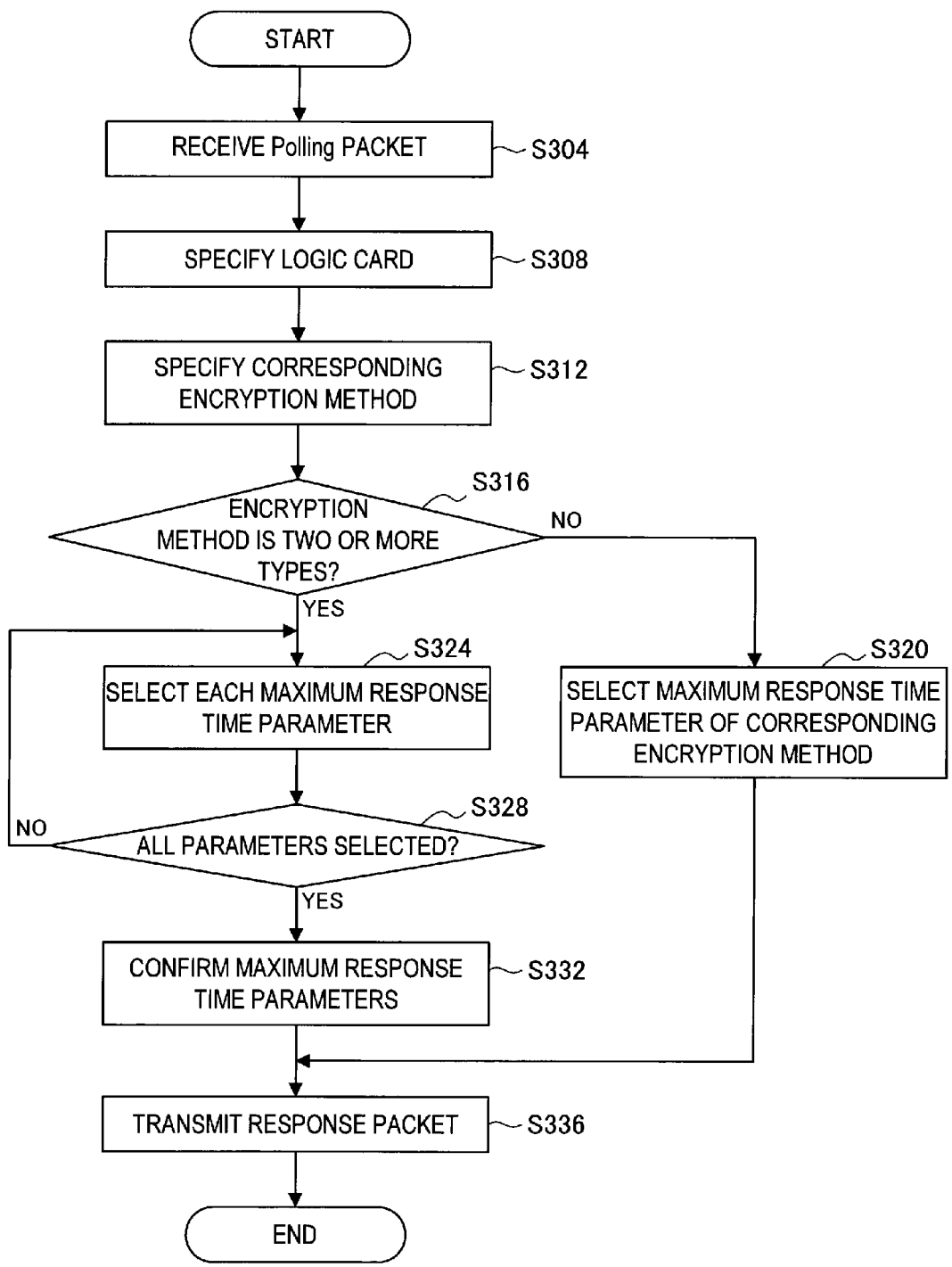
FIG. 13 is a flowchart showing a flow of a detailed operation of the non-contact IC card.

FIG. 13 is a flowchart showing a flow of a detailed operation of the non-contact IC card 22. As shown in FIG. 13, when receiving the Polling packet (S304), the communication control unit 218 of the non-contact IC card 22 specifies the specified logic card based on the system cord described in the Polling packet (S308). The communication control unit 218 then specifies the encryption method to which the specified logic card corresponds (S312).

If the specified encryption method is one type (S316), the communication control unit 218 selects the maximum response time parameters P1 to P6 of the specified encryption method (S320). If the specified encryption method is two types (S316), the communication control unit 218 compares the maximum response time parameters P1 to P6 of each encryption method, and selects each maximum response time parameter P1 to P6 (S324). The communication control unit 218 selects the maximum response time parameters P1 to P6 of the longest specified retransmission interval for every parameter P1 to P6 of the maximum response time parameters P1 to P6 of two or more types of encryption methods.

When selecting all maximum response time parameters P1 to P6 (S328), the communication control unit 218 confirms the maximum response time parameters P1 to P6 (S332). Thereafter, the communication control unit 218 generates a response packet containing the maximum response time parameters P1 to P6 selected in S320 or the maximum response time parameters P1 to P6 confirmed in S332, and transmits the same to the reader/writer 10 (S336).

[5] CONCLUSION

As described above, the non-contact IC card 22 according to the present embodiment stores the maximum response time parameters P1 to P6 corresponding to a plurality of encryption methods and specifying the retransmission interval of each communication command for every plurality of encryption methods. Therefore, according to the non-contact IC card 22 of the present embodiment, the retransmission interval of the communication command in the reader/writer 10 can be optimized in any communication methods.

For instance, according to the non-contact IC card 22 of the present embodiment, a short retransmission interval is applied at the ticket barrier of railroads where reduction of processing time is important, and a long retransmission interval can be applied when advanced security level is important and encryption processing time is assumed to become long.

Various modifications, combinations, sub-combinations and alterations may occur depending on design requirements and other factors insofar as they are within the scope of the appended claims or the equivalents thereof.

For example, an example in which the non-contact IC card 22 corresponds to two types of encryption methods has been described in the embodiment described above, but the present invention is not limited to such example. The non-contact IC card 22 may correspond to a great number of encryption methods such as encryption method 3 and encryption method 4 in addition to the encryption method 1 and the encryption method 2. In this case, the non-contact IC card 22 may store a set of maximum response time parameters P1 to P6 of the number of corresponding encryption methods. An example where the six types of maximum response time parameters are provided has been described in the above embodiment, but embodiments are not limited to such an example, and the maximum response time parameter of an arbitrary type may be prepared.

An example of, when the specified logic card corresponds to a plurality of encryption methods, selecting the parameters P1 to P6 of longest specified retransmission interval for every parameter P1 to P6 of the maximum response time parameters P1 to P6 of the plurality of encryption methods has been described in the above embodiment. However, the embodiment is not limited thereto, and the non-contact IC card 22 may select the parameter of shortest specified retransmission interval for every parameter.

Each step in the processes of the reader/writer 10 and the non-contact IC card 22 of the present specification may not be processed in time-series according to the order described in the sequence chart or the flowchart. For instance, each step in the processes of the reader/writer 10 and the non-contact IC card 22 may include processes executed in parallel or individually (e.g., parallel process or process by object).

A computer program for causing the hardware such as the CPU, the ROM, and the RAM incorporated in the reader/writer 10 and the non-contact IC card 22 to execute functions similar to each configuration of the reader/writer 10 and the non-contact IC card 22 may be created. A storage medium stored with such computer program may be provided. The series of processes may be realized by hardware by configuring the respective function blocks shown in the function block diagram of FIG. 7 with hardware.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication apparatus comprising:
a non-contact communication unit configured to perform non-contact communication with a reader/writer;
a storage unit configured to store data for every logic system corresponding to at least one encryption method, and retransmission interval information of each communication command transmitted from the reader/writer for every encryption method, wherein the storage unit is further configured to store a plurality of different encryption methods each having different retransmission interval information; and
a selection unit configured to select the retransmission interval information of each communication command in the encryption method to which the logic system specified by the reader/writer corresponds from the storage unit, wherein
the retransmission interval information selected by the selection unit is transmitted from the non-contact communication unit to the reader/writer.

2. The communication apparatus according to claim 1, wherein the selection unit is further configured to compare the retransmission interval information of each communication command for every plurality of encryption methods, and select the retransmission interval information indicating longer interval for every communication command when the logic system specified by the reader/writer corresponds to the plurality of encryption methods.

3. A reader/writer comprising:
a non-contact communication unit configured to perform non-contact communication with a communication apparatus;
a generation unit configured to generate a packet transmitted from the non-contact communication unit to the communication apparatus, the packet containing specification information of a logic system corresponding to at least one of a plurality of different encryption methods stored in the communication apparatus, wherein each encryption method has different retransmission interval information; and
a communication control unit configured to perform a retransmission control of the communication command to the communication apparatus based on the retransmission interval information for every communication command which differs according to the encryption method to which the logic system specified by the packet corresponds and which is contained in a response packet transmitted from the communication apparatus according to the packet.

4. A communication system comprising:
a reader/writer; and
a communication apparatus including, a first non-contact communication unit configured to perform non-contact communication with the reader/writer, a storage unit configured to store data for every logic system corresponding to at least one encryption method and retransmission interval information of each communication command transmitted from the reader/writer for every encryption method, wherein the storage unit is further configured to store a plurality of different encryption methods each having different retransmission interval information, and a selection unit configured to select the retransmission interval information of each communication command in the encryption method to which the logic system specified by the reader/writer corresponds from the storage unit, the retransmission interval information selected by the selection unit being transmitted from the first non-contact communication unit to the reader/writer, wherein the reader writer includes, a second non-contact communication unit configured to perform non-contact communication with the communication apparatus, a generation unit configured to generate a packet, containing specification information of the logic system, transmitted from the second non-contact communication unit to the communication apparatus, and a communication control unit configured to perform a retransmission control of the communication command to the communication apparatus based on the retransmission interval information for every communication command transmitted from the communication apparatus according to the packet.

5. A communication method comprising:

specifying an arbitrary logic system through non-contact communication from a reader/writer;

selecting retransmission interval information of each communication command in an encryption method to which the logic system specified by the reader/writer corresponds from a storage medium for storing data for every logic system corresponding to at least one encryption method, the retransmission interval information of each communication command transmitted from the reader/writer for every encryption method, and a plurality of different encryption methods each having different retransmission interval information; and transmitting the selected retransmission interval information to the reader/writer through non-contact communication.

* * * * *